United States Patent
Kamdar et al.

(10) Patent No.: US 12,234,407 B2
(45) Date of Patent: Feb. 25, 2025

(54) COMPOSITIONS USEFUL FOR DIVERTING OR STOPPING FLUIDS IN SUBTERRANEAN OPERATIONS

(71) Applicant: Finoric, LLC, Beasley, TX (US)

(72) Inventors: Ambrish Kamdar, Sugar Land, TX (US); Deepak Patil, Friendswood, TX (US)

(73) Assignee: Finoric, LLC, Beasley, TX (US)

( * ) Notice: Subject to any disclaimer, the term of this patent is extended or adjusted under 35 U.S.C. 154(b) by 14 days.

(21) Appl. No.: 16/468,443

(22) PCT Filed: Jan. 13, 2017

(86) PCT No.: PCT/US2017/013422
§ 371 (c)(1),
(2) Date: Jun. 11, 2019

(87) PCT Pub. No.: WO2017/123937
PCT Pub. Date: Jul. 20, 2017

(65) Prior Publication Data
US 2021/0130678 A1  May 6, 2021

(51) Int. Cl.
| | | |
|---|---|---|
| *E21B 43/27* | (2006.01) | |
| *C09K 8/50* | (2006.01) | |
| *C09K 8/508* | (2006.01) | |
| *C09K 8/514* | (2006.01) | |
| *C09K 8/518* | (2006.01) | |
| *C09K 8/60* | (2006.01) | |
| *C09K 8/72* | (2006.01) | |
| *E21B 33/138* | (2006.01) | |
| *E21B 43/04* | (2006.01) | |
| *E21B 43/267* | (2006.01) | |

(52) U.S. Cl.
CPC ............ *C09K 8/5086* (2013.01); *C09K 8/501* (2013.01); *C09K 8/5083* (2013.01); *C09K 8/514* (2013.01); *C09K 8/518* (2013.01); *C09K 8/601* (2013.01); *C09K 8/605* (2013.01); *C09K 8/72* (2013.01); *E21B 33/138* (2013.01); *E21B 43/04* (2013.01); *E21B 43/267* (2013.01); *E21B 43/27* (2020.05); *C09K 2208/32* (2013.01)

(58) Field of Classification Search
None
See application file for complete search history.

(56) References Cited

U.S. PATENT DOCUMENTS

| | | | | |
|---|---|---|---|---|
| 7,220,709 B1 * | 5/2007 | Qu | ............ | C09K 8/74 |
| | | | | 166/305.1 |
| 2014/0174736 A1 * | 6/2014 | Reddy | ............ | C09K 8/74 |
| | | | | 548/518 |
| 2018/0127640 A1 * | 5/2018 | Nguyen | ............ | C09K 8/94 |

* cited by examiner

*Primary Examiner* — Andrew Sue-Ako
(74) *Attorney, Agent, or Firm* — McCutcheon Joseph, PLLC

(57) ABSTRACT

The flow of a fluid may be diverted from a high permeability zone to a low permeability zone of a subterranean formation or well sections may be temporarily isolated by use of particles comprising a mixture of (i) at least one bi-phenyl compound of Compound I, (ii) one mellitic derivative of Compound II, (iii) one chelating agent of Compound III, (iv) one polymer of Compound IV, and (v) an internal breaker for the diverting agents and other additives like gels, foams, acids, brines and various other treatment chemicals.

17 Claims, 2 Drawing Sheets

COMPOSITIONS USEFUL FOR DIVERTING OR STOPPING FLUIDS IN SUBTERRANEAN OPERATIONS

CROSS-REFERENCE

The present application claims the benefit of U.S. Provisional Patent Application No. 62/279,302, filed on Jan. 15, 2016, which is hereby incorporated by reference herein in its entirety, including but not limited to those portions that specifically appear herein.

FIELD OF INVENTION

The disclosure relates to methods of diverting or directing well treatment fluids away from high permeability zones of subterranean formations and towards low permeability zones throughout the temperature range of 60° F. to 450° F., and providing means of temporary isolation of a zone.

BACKGROUND OF INVENTION

Geological strata of varying composition, ranging from very hard rock to unconsolidated particulate matter may be traversed by wellbores drilled for oil and natural gas extraction. Each stratum may contain entrapped fluids of varying composition, e.g., the desired natural gas or petroleum, or aqueous brines, and these fluids may be present over a wide range of internal pressures.

Managing the flow of these intrinsic fluids through subterranean strata possessing different permeabilities and porosities is critical to successful extraction of hydrocarbons. Fluid management is actually critical before hydrocarbon extraction can begin: The viscoelastic properties and density of drilling fluids, "muds" and several other "service" fluids used during different stages of well development must be regulated, which in turn, rests upon controlling these fluids' flow through the subterranean structure.

Among the first fluids requiring management are drilling fluids and "muds" that are usually pumped into the wellbore through a cylindrical steel casing that encases the drillshaft. The casing's external diameter is less than that of the drillbit, creating an annulus between the casing exterior and the wellbore diameter which, of course, is determined by the drillbit diameter.

Drilling fluids serve to lubricate and cool the drillbit, and convey drill cuttings upward through the surrounding annulus. Drilling fluids and muds can be thixotropic, meaning their viscosity increases when shear forces, such as those supplied by the drillbit and drillshaft's rotary motion, are released. This "shear thinning" property allows drill cuttings to ascend easily in the mud flow as drilling occurs, but remain suspended in the more viscous fluid that results from shear release, e.g., in periods when drilling stops.

Drilling fluids and "muds" can also serve to inhibit the intrusion of unwanted fluids from subterranean structures into the wellbore. Drilling fluid and mud viscosities, viscoelastic responses, and their densities can be varied during the drilling process to optimize these properties as field conditions require. But, regulating these properties is made difficult, if not impossible, when high losses of these introduced fluids into permeable subterranean structures occur.

Other "service" fluids that are typically used in later well development stages, such as hydraulic fracturing fluid, or fluids injected from ancillary injection wellbores to drive the desired hydrocarbons to the collection wellbore, can similarly be lost into so-called "thief" zones, and of course, so can the desired hydrocarbons.

Fluids tend to flow along paths of least resistance, so it is desirable to reduce flow resistance, i.e., increase permeability, in hydrocarbon-bearing subterranean structures to enhance hydrocarbon flow to the wellbore.

It may similarly be desirable to increase resistance to flow elsewhere, to prevent loss of hydrocarbons into such zones, or to curtail the loss of introduced fluids.

There are instances where the volume of the geological formation in which it is desired to increase flow resistance can be rather small. For example, a small zone possessing a relatively highly permeability may serve as a conduit for a disproportionate amount of fluid flow, possibly thwarting fluid direction efforts.

Maintaining zone permeabilities can be complicated by several processes necessary for hydrocarbon extraction.

One of these processes is the extraction itself wherein large amounts of hydrocarbon may be removed from the formation, and these hydrocarbons may be replaced with a different material, such as brine.

Inducing and sustaining fluid flow may cause the migration of existing or introduced particulate matter along the flow through the geological formation. This migration not only has the potential to change permeabilities throughout the regions of flow, but also has the potential to destabilize the geological formation if intercession does not prevent collapse.

At least two techniques are used to increase permeability in a subterranean geological formation zone. (For clarity, we note that an initially vertical wellbore may have horizontal branched portions, or that the majority of an unbranched wellbore may be fundamentally horizontal, having been progressively "angled" during drilling.)

One permeability enhancement technique is acid stimulation, wherein an acid or an acid-forming material is injected into the hydrocarbon-bearing subterranean formation. The acid dissolves minerals in the formation, creating or enlarging tiny channels and pores (sometimes interchangeably referred to as "wormholes" or "slugs.").

While acid stimulation works best in carbonate formations, and since the acidification reaction products are soluble in the spent acid, there is sometimes incentive to otherwise employ it as acid stimulation to assist in removing blockages caused by other drilling activities.

Another permeability enhancement technique is hydraulic fracturing, more commonly known as "fracking", wherein a hydraulic fracturing fluid is pumped into the structure to a pressure that exceeds the formation's confining stresses, inducing fractures within the formation. Hydraulic fracturing fluids are initially sufficiently viscous to effectively suspend and convey "proppants," typically fine sand particles, into the newly-created fissures. Hydraulic fracturing fluids are usually formulated to undergo a dramatic viscosity decrease after an interval deemed sufficient for the proppants to have been delivered to these fissures. Prior to the expected viscosity transition, the hydraulic pressure sustaining the opened fissures is reduced, so that the fissures close until they are stopped by the entrapped proppants. The viscosity decrease that follows results in an orders-of-magnitude increase of outflow of the now-spent hydraulic fracturing fluid from small fissures that would otherwise be unacceptably slow.

A successful outcome with either of these "secondary recovery" techniques results in increased hydrocarbon flow, as well as any fluids injected from ancillary wellbores that are intended to drive hydrocarbons to the recovery wellbore.

This success, however, ultimately leads to a hydrocarbon-depleted, permeable zone that is susceptible to the inflow of drilling fluids, treatment fluids, and hydrocarbons that may be recovered elsewhere.

Mechanical and chemical methods have been developed to prevent the flow of fluids to high-permeability subterranean formation regions.

Mechanical diversion methods rely upon restricting treatment fluid entry point(s) along the wellbore. Essentially, mechanical diversion methods consist of avoiding high-permeability zones.

Chemical diversion methods typically comprise placing chemical agents within, or on the face of, high permeability regions to increase its resistance to flow. A simple description of chemical diversion techniques' underlying mechanism shows several notable similarities to hydraulic fracturing methods.

Both fracking and chemical diversion involve pumping suspensions of particles into the subterranean formation, and in both instances the fluid follows the path of least resistance. In fracking the suspended particles are meant to be durable and retained indefinitely in the fissures created by hydraulic fracturing, in order to sustain the zone's increased permeability. In contrast, the particles of chemical diversion methods are meant to occupy and clog pores and fissures, or to cover them, thereby decreasing permeability. Further, unlike the particles used in fracking, diversion treatment particles are intended to act temporarily, and lose their effectiveness by degrading via dissolution into intrinsic or supplied fluids, or by possessing an intrinsic instability, or melting, sublimation, or other means.

Polymeric chemical diversion particles may be formulated from many different monomers, and formulated as blended polymers or as copolymers. As with the particles in hydraulic fracturing fluids, chemical diversion particles may be suspended in gels prior to use.

US Patent Application No. 2014/0116702 discloses the use of lignosulfonates; chitins; chitosans; proteins; proteinous materials; fatty alcohols; fatty esters; fatty acid salts; aliphatic polyesters; poly(lactides); poly(glycolides); poly($\mu^L$-caprolactones); polyoxymethylene; polyurethanes; poly(hydroxybutyrates); poly(anhydrides); aliphatic polycarbonates; polyvinyl polymers; acrylic-based polymers; poly(amino acids); poly(aspartic acid); poly(alkylene oxides); poly(ethylene oxides); polyphosphazenes; poly(orthoesters); poly(hydroxy ester ethers); polyether esters; polyester amides; polyamides; polyhydroxyalkanoates; polyethyleneterephthalates; polybutyleneterephthalates; polyethylenenaphthalenates, and copolymers, blends, derivatives, or combinations thereof for chemical diversion.

U.S. Pat. No. 8,109,335 discloses the use of a fatty alcohol, a fatty acid salt, a fatty ester, waxes, and a protein material as chemical diverting agents. However, as it is not possible to make a homogenous blend of these ingredients, these mixtures' use is limited to low temperatures because the diverting agents disclosed melt at high temperatures.

US Patent Application No. 2011/0308802 discloses the use of starch, guar, chitosan, hydroxypropyl guar, hydroxymethyl guar, xanthan, hydroxyethyl cellulose, and proteins (e.g. collagen, fibrin, and gelatin) as chemical diverting agents. These gel-forming ingredients are water soluble, but neither the ingredients nor the gels they form are hydrocarbon-soluble. Once hydrocarbon flow commences and displaces the aqueous phase, the gels degrade very slowly and so these agents do not promote hydrocarbon recovery from small fractures once the hydrocarbon flow starts.

Chemical diversion particles also have been made from agricultural products (e.g., ground walnut shells, corn, milo, etc.) and other materials.

U.S. Pat. No. 3,724,549 discloses the use of cyclic and linear hydrocarbon resins, pentaerythritol esters of polymerized rosins and pentaerythritol esters of dimeric resin acids, wax beads, naphthalene, sodium chloride, corn, milo, millet and peas as chemical diverting agents. However, several of these chemicals, and all agricultural chemicals, are neither soluble in oil nor water and therefore must be removed from the formation by mechanical means.

US Patent Application No. 2014/0352959 discloses the use of combinations of polylactic acid and phthalic anhydride/acid and phthalic related compounds as chemical diverting agents. The ingredients are dry-blended to optimize their product's performance at high or low temperatures; polylactic acid-rich mixtures are well-suited for higher temperatures while phthalic anhydride/acid-rich mixtures are better for lower temperatures. Phthalic acids are well-known "plasticizers", additives used to modify deformability, polymer viscosity, melting point, and other properties. The formulations described in US Patent Application No. 2014/0352959 can be optimized for specific shale temperatures.

U.S. Pat. No. 7,506,689 discloses the use of sodium acetate trihydrate, L-tartaric acid disodium salt dihydrate, sodium citrate dihydrate, sodium carbonate decahydrate, sodium borate decahydrate, sodium tetraborate decahydrate, sodium hydrogen phosphate heptahydrate, sodium phosphate dodecahydrate, amylose, starch-based hydrophilic polymers, or cellulose-based hydrophilic polymers as chemical diverting agents. While most of these chemicals are water soluble, making preparation and downhole delivery easy, they are generally not hydrocarbon-soluble, and consequently structures they form degrade slowly once hydrocarbon flow has displaced water.

US Patent Application No. 2013/0341025 discloses the use of combinations of polylactic acid and phthalic anhydride/acid and phthalic acid related compounds as chemical diverting agents. However, polylactic acid is known to take from days to months to hydrolyze within the range pH=5 to pH=8, common in wellbore environments.

While the chemical diversion agents described in the aforementioned patents exhibit acceptable degradation rates at higher or lower temperatures, they do not function throughout a range of temperature between high and low temperatures. Thus, there is a need for a method of diverting that exhibit desirably high degradation rates throughout the temperature range from about 80° F. to about 450° F.

SUMMARY OF INVENTION

This disclosure relates to methods of diverting or directing well treatment fluids away from high permeability zones of a subterranean formation by temporarily increasing the resistance to fluid flow in the high permeability zones throughout the normal "downhole" temperature range from about 80° F. to about 450° F.

Decreasing the permeability of a subterranean formation may be achieved by providing diverting particles suspended in a fluid, where said particles essentially comprise a mixture of the Compounds shown in FIG. 1 and FIG. 2 (hereinafter referred to as Compounds I and II, respectively).

Typically, the fluid suspension is pumped into the subterranean structure where it follows the path of least resistance to subterranean formation zones having the largest pores and fissures.

Alternatively, the diverting treatment fluid may be injected directly into the most permeable zone or zones.

The high permeability geological formation zone may be thought of as acting somewhat as a sieve, its pores and fissures accruing diverting particles that exceed the pore's "throat" diameter from the flowing suspension. Once covered, or alternatively, "bridged," the fundamentally unfilled, capped pore is unavailable to convey fluid flow, and the remaining diverting fluid is shunted to another permeable portion of the formation.

Multi-step divertment procedures with decreasing mean diverting particle size may be repeated to more effectively seal or "plug" the zone.

Diversion usually ends when the diverting particles retained by the permeable zone dissolve in fluids already present in the subterranean formation, or in fluids supplied later, or by the melting or sublimation of the particles at the subterranean formation's temperature.

The diverting particles, essentially comprising mixtures of Compounds I and II, possess significant water and hydrocarbon solubilities. Consequently, the particles and aggregates they form will degrade in either aqueous or hydrocarbon environments. This property insures that their effectiveness as diverting particles will be temporary, independent of subsequent "downhole" events.

Unlike diverting particles that possessing poor water solubility, the diverting particles disclosed herein will continue to degrade in the supplied divertment treatment fluid, and hence will not permanently inhibit the entry of other aqueous or hydrocarbon fluids.

Unlike diverting particles possessing poor hydrocarbon solubility, the particles of this invention will not permanently stop or limit hydrocarbon flow if hydrocarbon intrusion occurs.

In one embodiment of the method, an acidizing fluid containing diverting particles comprising mixtures of Compounds I and II are further combined with a thermoplastic polymer that imparts greater mechanical strength to the diverting particles. The diverting particles containing polymers can be physically combined or molten to make a homogenous mixture.

In another embodiment of the method, diverting particles comprising one or more of Compounds I and II are suspended in a fluid that is injected directly into a known high permeability zone. The volume of fluid injected is meant to fill this high permeability zone, creating a "fluid loss pill" that inhibits the entry ("leak-off") of other treatment fluids, particularly completion fluids that are targeted elsewhere.

In another embodiment of the method, diverting particles comprising one or more of Compounds I and II are used in a wellbore completion fluid to form a layer of solids, known in the trade as "filter cake", which bridges the pores and fissures in the wellbore. The operator may control leak-off of the treatment fluid to the formation by controlling the size difference between the injected particles and the pore throat diameter. The solid diverter particles are deposited only partially in the pore or fissure, that is, essentially limited to the formation wall, forming a substantially impermeable "filter cake".

In another embodiment of the method, small well casing perforations may be treated with diverting particles essentially comprising Compounds I and II to minimize leak-off.

In another embodiment of the method, diverting particles essentially comprising mixtures of Compounds I and II are used as a replacement for sand, or may be used along with sand, which is a component of wellbore "clean-out" fluids. In "clean-out" operations, solid debris, particularly hydrophobic materials, are removed from the wellbore in order to ensure unobstructed hydrocarbon recovery. For instance, though not required for the invention, it is believed that when fluid containing diverting particles is introduced into the wellbore, the diverting particles will adhere to and agglomerate the hydrophobic materials. The agglomerate-modified hydrophobic materials are then pumped upwards to the surface. The size of the diverting particles delivered with the clean-out fluid may be adjusted so that the fluid is directed to specific wellbore sites. In contrast to prior art, this method does not require the diverting particles to be "cleaned out" because the diverting particles used in this novel method will disintegrate with time.

In another application, a method for mitigation of sand migration can be done by "gravel packing," where diverting particles of a desired size (known as "gravel" in the art) are placed to act as sort of a filter, preventing further ultrafine sand movement, yet still maintaining permeability. Wellbores often penetrate subterranean formations that contain unconsolidated particles, for example, ultra-fine sand that may migrate when oil, gas, water, or other fluids flow. These ultrafine particles' flow may result in plugging flow channels elsewhere in the formation, and importantly, their displacement may destabilize portions of the formation. A wide range of gravel sizes are used, according to the characteristics of the subterranean formation. In contrast to prior art, this method does not require the diverting particles to be "cleaned out" because the diverting particles used in this novel method will disintegrate with time.

In another embodiment of the method of, "gravel packing" is done with slurries containing particles comprising Compounds I and II that are introduced into the wellbore, and placed adjacent to the subterranean formation by circulation, or other suitable method. The goal is to form a fluid-permeable, but sand-resistant "pack" in the annulus between the exterior of the screen and the interior of the wellbore. This use is determined by the customer to best divert fluids for the particular needs of the customer. In contrast to prior art, this method does not require the diverting particles to be "cleaned out" because the diverting particles used in this novel method will disintegrate with time.

DETAILED DESCRIPTION OF THE INVENTION

Figure 1:
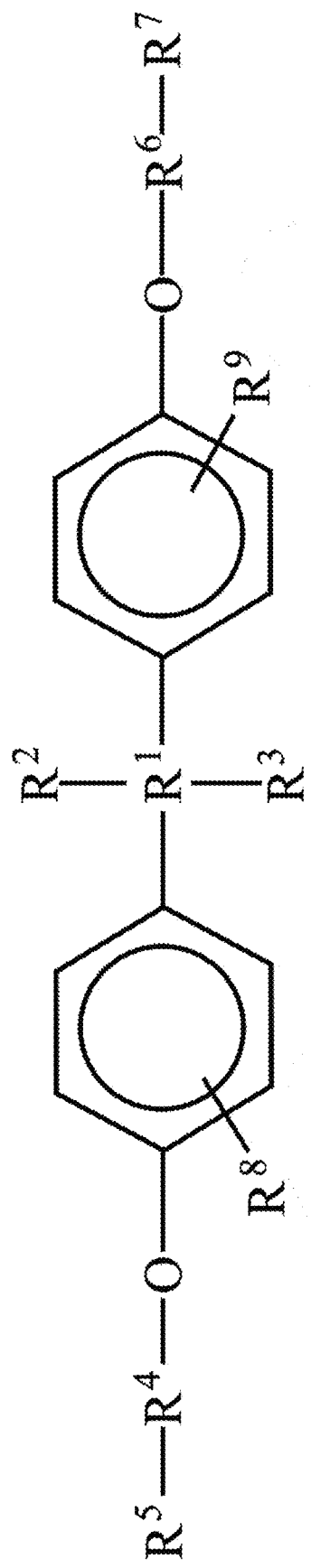
FIG. 1 depicts diverting agents of the general formula described therein.

Phenols, phenyl esters, Phenyl ethers, phenyl thioethers, diphenylamines, triphenylamines and aryl derivatives as shown in FIG. 1 for use as diverter particles in the method disclosed herein include those having the formulas shown in FIG. 1.

Example compounds for the diverting agents shown in FIG. 1 include bisphenols of type A, B C, AP, bisphenol acetates, bisphenol formats, bisphenol phthalates, and bisphenol maleates.

Figure 2:
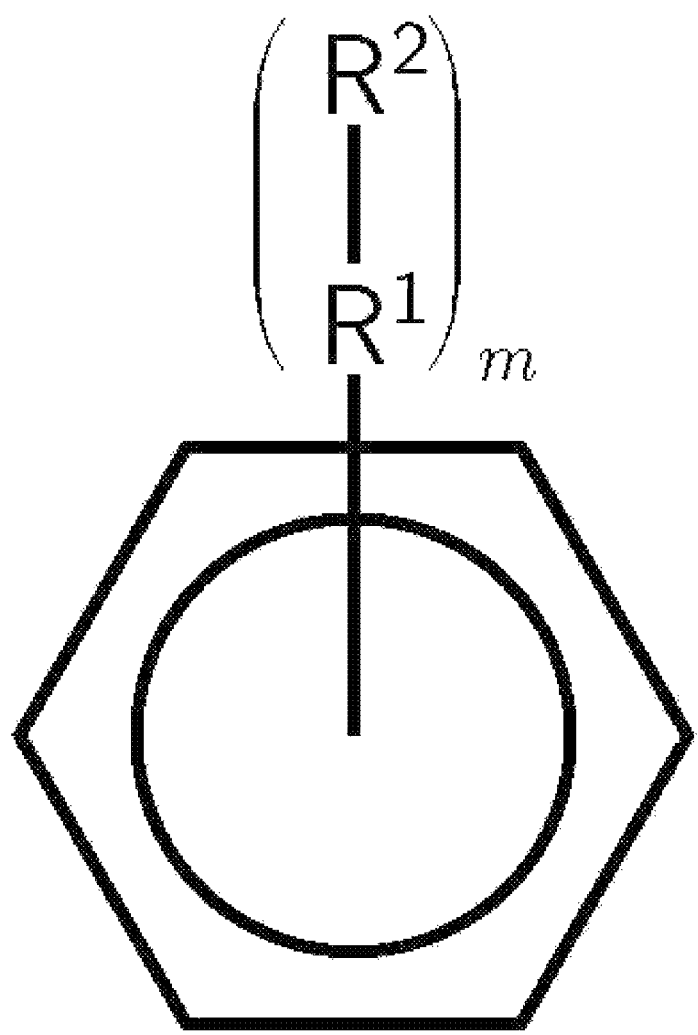
FIG. 2 depicts diverting agents that are derivatives of mellitic acid.

Example compounds for diverting agents shown in FIG. 2 include pyromellitic, trimellitic, mellitic, anhydrides and acids, and C1 to C6 esters of these mellitic acids.

The physical properties of diverting particles, essentially comprising mixtures of Compounds I and II, may be further modified by adding a polymer or other material such as chelating agents, wherein the molecular weight of the polymer or the other material is selected to adjust the specific gravity of the diverting particle, wherein typically the polymer is a low solubility or degrading polymer of a molecular weight of 500 to 30 million Daltons.

The ratio of Compound I to Compound II may range between 0% and 100% to between 100% and 0%. The chelating agent may range from about 5% to about 90% of the total weight of the diverting particle. The polymer may range from about 5% to about 90% of the weight of the diverting particle.

The specific gravity of the diverting particle determines in part whether the diverting particle remains suspended in the carrying fluid. With increasing diverting particle density, a corresponding increase in fluid viscosity is required to maintain a given useful lifetime of the suspension. However, viscous solutions may be difficult to pump through torturous geological formations. Further, if the specific gravity of the diverting particles is too low, the particles will float, but if the specific gravity of the particles is too high, the particles were sink too quickly. Thus the optimal viscosity may be attained by adjusting the specific gravity of the diverting particles.

Examples of chelating agents that may be used include, but are not limited to, methylene phosphonates such as aminotrismethylene phosphonate, ethylenediaminotetramethylene phosphonate, and Bis(HexaMethylene Triamine Penta (Methylene Phosphonic Acid)), and methylene carboxylates, such as nitrilotrisacetic acid, EDTA, and diethylenetriaminepentaacetic acid (DTPA).

Examples of polymers that may be used include, but are not limited to polylactic acid, polyglycolic acid, polyolefins, polyesters, polyamides, polycarbonates, polyacetals, polymelamines, polyvinyl chlorides, polyvinyl alcohols, polyvinyl acetates, polyvinyl esters, polyacrylates, bisphenol based monomers, isocyanates, copolymers of these monomers, and blends of the polymers or copolymers manufactured from monomers used in these polymers.

Other exemplary polymers include polysaccharides such as dextran or cellulose; chitin; chitosan; proteins; orthoesters; poly(glycolide); poly(c-caprolactone); poly(hydroxybutyrate); poly(anhydrides); aliphatic polycarbonates; poly(orthoesters); poly(amino acids); poly(ethylene oxide); and polyphosphazenes.

The added polymer may be blended as dry materials or molten, blended and cooled to form an intimate blend.

Plasticizers may be added to the combination of polymers and one or more of Compounds I and II. Exemplary plasticizers are phthalic esters, polyethylene, ethylene and vinyl acetate copolymer, polyesters, polycarbonates, polyvinyl alcohols, partially-hydrolyzed polyvinyl acetate, as well as homopolymers, random, block and graft copolymers.

The size of the particles comprising Compounds I and II may be optimized for the particular formation to more effectively block the penetration of the fluids applied subsequent to our treatment fluid into high permeability zones of the formation. Particle size diameters range from about 0.1 micron to about 7.1 mm, and preferably, between about 20 microns and 6000 microns.

The shape of particles comprising Compounds I and II may be substantially spherical, beaded, or pelleted, non-beaded or in non-spherical elongated, tapered, egg, teardrop, flake, platelet or oval shape. The particles may be cubic, bar-shaped (as in a hexahedron with a length greater than its width, and a width greater than its thickness), cylindrical, multi-faceted, flakes, or irregular. The particles may have roughened, irregular or substantially smooth surfaces.

The particles comprising Compounds I and II may be used in wells where the bottomhole temperature is between 80° F. and 450° F., and are particularly effective when placed into wells having bottomhole temperatures between about 140° F. and about 450° F.

Any fluid suitable for transporting conventional particles into the reservoir and/or subterranean formation such as water, salt brine and slickwater may be used for the particles of this invention. Suitable brines including those containing potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, and mixtures thereof. The percentage of salt in the water preferably ranges from about 0% to about 60% by weight, based upon the weight of the water.

The treatment fluid may be foamed with a liquid hydrocarbon or a gas or liquefied gas such as nitrogen or carbon dioxide. Additionally, the fluid may further be foamed by inclusion of a non-gaseous foaming agent. The non-gaseous foaming agent may be amphoteric, cationic or anionic. Suitable amphoteric foaming agents include alkyl betaines, alkyl sultaines and alkyl carboxylates. Suitable anionic foaming agents include alkyl ether sulfates, ethoxylated ether sulfates, phosphate esters, alkyl ether phosphates, ethoxylated alcohol phosphate esters, alkyl sulfates and alpha olefin sulfonates. Suitable cationic foaming agents include alkyl quaternary ammonium salts, alkyl benzyl quaternary ammonium salts and alkyl amino amine quaternary ammonium salts.

The fluid containing the particles composed of the Compounds I and II may optionally other additives known in the well service industry such as gelling agents, fluid loss additives, enzymatic or oxidative gel breakers, surfactants, biocides, mutual solvents, surface tension reducing agents, defoaming agents, demulsifiers, non-emulsifiers, scale inhibitors, gas hydrate inhibitors, clay stabilizers, acids, buffers, solvents or encapsulated acid, encapsulated bases, and mixture thereof.

Where the fluid containing the particles is an acidizing fluid, it may be preferable to include within the fluid a corrosion inhibitor, a corrosion inhibitor intensifier, or a combination thereof. The purpose of these additives is to reduce the corrosive effects that the acids may have on the well tubes. Suitable corrosion inhibitors can include alkali metal nitrites, nitrates, phosphates, silicates and benzoates. Corrosion inhibitors can also include the alkanolamines such as ethanolamine, diethanolamine, triethanolamine and the corresponding propanolamines as well as morpholine, ethylenediamine, N,N-diethylethanolamine, alpha and gamma-picoline, piperazine and isopropylaminoethanol.

Representative suitable organic inhibitors include hydrocarbyl amine and hydroxy-substituted hydrocarbyl amine neutralized acid compound, such as neutralized phosphates and hydrocarbyl phosphate esters, neutralized fatty acids (e.g., those having 8 to about 22 carbon atoms), neutralized carboxylic acids (e. g., 4-(t-butyl)-benzoic acid and formic acid), neutralized naphthenic acids and neutralized hydrocarbyl sulfonates. Mixed salt esters of alkylated succinimides are also useful.

The pH of the treatment fluid is a very important factor in regulating the diverting particle's lifetime. The treatment fluid may be adjusted by any means known in the art, including adding acid or base to the fluid, or bubbling carbon dioxide through the fluid. Adjusted treatment fluid pH may lie typically between 0 and 14.

Typically, the amount of aforementioned compounds in the fluid introduced into the well is between from about 0.01 to about 30 weight percent (based on the total weight of the fluid).

The treatment fluid may be gelled by the inclusion of viscosifying agents such as viscosifying polymers or viscoelastic fluids known to persons of ordinary skill in the art. The treatment fluid may optionally contain a crosslinking agent to increase viscosity, but crosslinking agents are not required. Generally, the viscosity of the treatment fluid is greater than or equal to 10 cP at room temperature.

In another embodiment of the method, diverter particles comprising Compounds I and II are introduced into the more permeable portions of productive zones, permitting the diversion of subsequent treatment fluids to the less permeable zones.

The "bottomhole" temperature, the temperature at the bottom of a hydrocarbon-producing zone, may lie between 140° F. and 450° F. The disclosed particles composed of the Compounds I and II are capable of operating as diverting particles in a wide range of well treatment fluids throughout this temperature range. The term "bottomhole" used throughout this application means the temperature of the zone at the bottom of the production zone.

Flow conductivity, as used throughout this application is defined as a flux, where a permeability factor is multiplied by the cross-sectional area of the traversing flow.

The size distribution of the particles should be sufficiently broad, e.g., from about 0.1 microns to 6 microns, so that the larger particles engage in large, relatively high-velocity flow pores to block them, while the smaller particles ultimately encounter pores that they cannot traverse The solid particles' "bridging" of flow-conductive pores creates what is known as a "filter cake" on the face of the formation.

The pressure drop though this filter cake increases flow resistance, diverting subsequent treatment fluids to less permeable formation zones. Filter cakes may be more easily formed when at least 60%, more preferably 80%, of the particles within the well treatment fluid have particle sizes between from about 20 microns to about 6000 microns.

For example, when employed in acid stimulation, the particle diameter range is sufficient, about 0.1 microns to 6000 microns, to bridge the flow space created by the injected acid dissolving the reservoir rock without penetration of the matrix. By being limited to the formation face, a relatively impermeable or low permeability filter cake is created on the face of the formation.

The novel method involving particles composed of Compounds I and II may be more effective in this so-called "viscous pill" application than conventional particles, because the particles of this invention do not dissolve or degrade as fast as conventional diverting agents at 450 F. The viscous pill formed from the diverter will have a finite invasion depth limited by the formation's mean pore diameter. Invasion depths will normally be greater in high permeability zones (owing to larger pore diameters) than in the lower permeability zones (with smaller, or partially-filled pores), so sections of the formation having greater invasion depths will accrue more diverter particles.

The diverter materials comprising mixtures of Compounds I and II are particularly applicable when used to increase hydrocarbon flow either far from the wellbore, or close to the wellbore. For instance, diverter particles composed of mixtures of Compounds I and II may be deposited in regular intervals along a horizontal wellbore portion.

The optimal particle size for mixtures of Compounds I and II is selected for each interval point, so the particles may flow from the wellbore into pores and fractures of permeable zones near each interval, packing the permeable zone. The subsequent injection of another treatment fluid, e.g., hydraulic fracturing fluid, may thereby be diverted from the permeable zone, and hence extended over a larger "stimulated rock volume" (SRV) of low permeability.

A particular example is limiting the fracturing of zones in formations, such as shale formations, that are known to require non-uniform interval packing coverage. Microseismic mapping and well temperature logging often show poor fracking fluid distribution over each interval, and unnecessary re-fracturing of nearby intervals. By directing the placement of fluid containing particulates of the diverter within the already-fractured zones, more regular interval fracturing is obtained.

The diverter material comprising mixtures of Compounds I and II may also be used to create a complex fracture network within a formation. After fractures are created or enlarged by a hydraulic fracturing fluid containing conventional proppants, a second fluid containing diverter particles composed of mixtures of Compounds I and II and a specified mean diameter, typically between about 325 mesh and about ½ inch, may be pumped into the formation to seal the smaller of the secondary fractures. At least one of the larger secondary fractures is likely to have a directional orientation distinct from that of the primary fracture, and a second hydraulic fracturing procedure will create a "branching" fracture. This process may be repeated with hydraulic fracturing fluids containing conventional proppants followed by treatment with fluids containing diverter particles composed of mixtures of Compounds I and II. In this manner, a highly branched fracture network may be created.

Re-fracturing of formations may sometimes be desired, particularly in horizontal wellbores, and the method disclosed in this application inserts diverter particles comprising mixtures comprising at least one example of Compound I and one example of Compound II may be of particular utility. In wellbores containing fundamentally horizontal portions, parts of the horizontal wellbore portion, or perhaps the entire wellbore, may be perforated in numerous locations by hydraulic fracture or acid stimulation. A "pill" or "plug" of a fluid containing particles comprising mixtures of Compounds I and II may be pumped into the formation, causing the closure of the pores so that permeable zones are sealed first, with the remaining diverter fluid moving toward the formation areas that are more difficult to treat.

Diverter particles may further be used in completion fluids. Completion fluids are utilized when conducting various completion operations in the producing formations. Such particulates seal off the face of the wellbore so that the fluid is not lost to the formation. The particulates are deposited and form a filter cake of the solids in the fluid over the surface of the wellbore without any loss of solids to the formation. As such, the particles form a fluid bridge over the formation pores rather than permanently plugging the pores.

In an acid stimulation operation, acid pumping may be followed by the pumping of a fluid containing the diverter. Further, a fluid containing the particles may be pumped into the wellbore in alternative stages and may be separated by "spacer" fluids, typical brines containing NaCl, KCl and/or NH4Cl. An exemplary pumping schedule is:

a) pumping an acid stimulation fluid;
b) optionally pumping a spacer fluid;

c) pumping a fluid containing the diverter;
d) optionally pumping a spacer fluid; and
e) repeating steps a) d), as needed.

Fluids containing diverter particles described herein may also have an internal breaker, encapsulated acid compounds, or encapsulated alkaline compounds, built into the system to insure that the fluid viscosity can be altered after a period of time. The internal breaker may also be an oxidizer such as, but not limited to, persulfates, such as ammonia persulfate and sodium persulfate, and peroxidizers, such as hydrogen peroxide. The internal breaker may also be an encapsulated acid or an encapsulated alkaline compound.

The formation subjected to the treatment of the invention may be a hydrocarbon or a non-hydrocarbon subterranean formation. The high permeability zone of the formation into which the fluid containing the diverter is pumped may be natural fractures. When used with low viscosity fracturing fluids, the diverter particles are capable of diverting fracturing fluids to extend fractures and increase the stimulated surface area.

The invention has particular applicability to the stimulation of carbonate formations, such as limestone, chalk or dolomite as well as subterranean sandstone or siliceous formations in oil and gas wells, including quartz, clay, shale, silt, chert, zeolite, or a combination thereof.

In another embodiment of the method, the diverter is introduced into coal beds having a series of natural fractures, or cleats, for the recovery of natural gases, such as methane, and/or sequestering a fluid which is more strongly adsorbing than methane, such as carbon dioxide and/or hydrogen sulfide.

In another embodiment of the method, the diverter is molded into a large sphere, cylinder, cube or similar shape, typically between about 1 inch and 18 inches. The large object, called a "temporary plug", can be machined to form a plug of desired size and diameter to be placed in a wellbore to isolate a certain section. The plug can be drilled through after it completes its function of allowing liquid to flow through. The liquid flow dissolves the remaining portion of the plug thus removing the remaining portion of the plug downhole. The present invention is useful in any application wherein a temporary plug is desired.

Although the phrase "temporary plug" is used, it should be understood that the invention can be substituted for permanent plugs in a well. In this use, the invention can provide the function-of a permanent well plug while providing the operational flexibility provided by a temporary plug.

The invention claimed is:

1. A method for moving oilfield liquids in a subterranean formation from high-permeability zones in the subterranean formation to low-permeability zones in the subterranean formations, the method comprising:
   a. pumping an acid stimulation fluid into the subterranean formation;
   b. pumping a spacer fluid into the subterranean formation;
   c. pumping a carrying fluid containing diverting material particles into the subterranean formation, the diverting material particles comprising a mixture of at least:
      i. one biphenolic Compound I having the general formula:

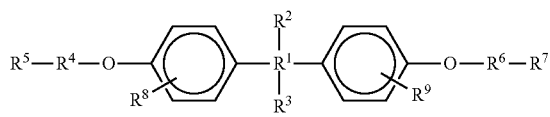

where $R^1$ is optionally selected from the group consisting of: $-(CH_2)p-$, where $1 \leq p \leq 6$, $-S-$, $-O-$, $=N-$, $-NH-$, a phenyl ring, wherein the two rings shown in FIG. 1 is configured in any of the o-, m-, or p-positions;

where $R^2$, $R^3$ are selected from the group consisting of: $-(CH_2)pCH_3$, where $1 \leq p \leq 5$, $-H$, $-SH$, $-NH_2$, $=O$, $-OH$, a halogen, and a phenyl ring;

where $R^4$, $R^6$ are selected from the group consisting of: $-(CH_2)p-$, where $1 \leq p \leq 6$, $-S-$, $-NH-$, $-(CO)-$, a phenyl ring, phthalyl, 1-naphthyl, 2-naphthyl, $-(CH_2)p-CH_2(NH)-$, where $1 \leq p \leq 5$, and $-(CH_2)p-CH_2-S-$ where $1 \leq p \leq 5$;

where $R^5$, $R^7$ are selected from the group consisting of: $-(CH_2)p-CH_3$, where $1 \leq p \leq 5$, $-H$, $-SH$, $-NH_2$, $=O$, halogen, $-(CH_2)p-CH_2X$, where X is any halogen and $1 \leq p \leq 5$, phenyl, phthalyl, 1-naphthyl, 2-naphthyl, $-(CH_2)p-CH_2-NH_2$, where $1 \leq p \leq 5$, $-(CH_2)p-CH_2-SH$, where $1 \leq p \leq 5$; and where $R^8$, $R^9$ are selected from the group consisting of: $(CH_2)p-CH_3$, where $1 \leq p \leq 5$, $-H$, $-SH$, $-NH_2$, halogen, $-(CH_2)p-CH_2X$, where X is any halogen and $1 \leq p \leq 5$, $-OH$, phenyl, phthalyl, 1-naphthyl, 2-naphthyl, $-(CH_2)p-CH_2-NH_2$, where $1 \leq p \leq 5$, and $-(CH_2)p-CH_2-SH$, where $1 \leq p \leq 5$;

ii. at least one or more mellitic acid derivatives (Compound II) having the general formula:

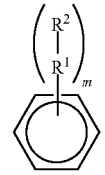

where $3 \leq m \leq 6$;
   i) where $R^1$ is selected from the group of: $-CO_2R^2$, $-(CH_2)p-(CO)-R^2$, $1 \leq p \leq 6$;
   ii) where $R^2$ is selected from the group of: $-H$, $-(CH_2)p-CH_3$, where $1 \leq p \leq 5$;

iii. a chelating agent (Compound III), selected from the group that consists of ethylene diaminetetraacetic acid (EDTA), diethylenetriaminepentaacetic acid (DTPA), a nitrilotriacetic acid (NTA), a methylene phosphonate, aminotrismethylene phosphonate, ethylenediaminetetramethylene phosphonate, or Bis (HexaMethylene Triamine Penta (Methylene Phosphonic Acid)), iv. a polymer (Compound IV) selected to adjust the fluid to a specific gravity approximately equal to the fluid, and selected from the group that consists of polylactic acids, polyglycolic acids, polyolefins, polyesters, polyamides, polycarbonates, polyacetals, polymelamines, polyvinyl chlorides, polyvinyl alcohols, polyvinyl acetates, polyvinyl esters, polyacrylates, polysaccharides, chitins, chitosans, proteins, orthoesters, poly(glycolide), poly(c-caprolactone), poly(hydroxybutyrate), poly(anhydrides), aliphatic polycarbonates, poly(orthoesters), poly(amino acids) polyethylene oxide polyphosphazenes, bisphenol-based monomers, isocyanates, copolymers of these monomers, and blends of the polymers or copolymers manufactured from these monomers, v. plasticizers selected from the group of phthalic esters, polyethylene, ethylene and vinyl acetate copolymers, polyesters, polycarbonates, polyvinyl alcohols, partially-hydrolyzed polyvinyl acetate, and homopolymers, block and graft copolymers thereof; and vi. corrosion inhibitors selected from the group consisting of alkali metal nitrites, nitrates, phosphates, silicates, benzoates, alkanolamines, ethanolamine, diethanolamine, triethanolamine, the corresponding propanolamines, and morpholine, ethylenediamine, N,N-diethylethanolamine, alpha-picoline, gamma-picoline, piperazine, and isopropylaminoethanol;

c. pumping a spacer fluid into the subterranean formation; and d. repeating steps (a) (d) as needed.

2. The method of claim 1 wherein the diverting particles range from about 1.0 micron to about 7.1 mm.

3. The method of claim 1 where filter cakes are formed when at about 60% to about 80% of the diverting particles are between from about 20 microns to about 6000 microns.

4. The method of claim 1 wherein Compounds I-IV are blended as dry materials.

5. The method of claim 1 wherein Compounds I-IV are blended as molten materials.

6. The method of claim 1 where the carrying fluid is an acidizing fluid with additives selected from the group consisting of non-emulsifiers, sludge control agents, iron chelating agents, corrosion inhibitors, biocides, and/or combinations thereof.

7. The method of claim 1 wherein the diverting particles may be are spherical, or beaded, or pelleted, or non-beaded, or non-spherical, or elongated, or tapered, or egg-shaped, or tear-drop, or flake, or platelet, or oval, or cubic, or bar-shaped, or cylindrical, or multi-faceted, flakes, or irregular in shape.

8. The method of claim 1 wherein the carrying fluid is selected from the group consisting of water, acid, salt brines, foaming fluids, gelled fluids, and slickwater.

9. The method of claim 8 wherein the salt brine comprises water containing a salt that is selected from the group consisting of potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, and mixtures thereof, wherein the percentage of salt in the water ranges to about 60% by weight.

10. The method of claim 1 where the carrying fluid is foamed with a liquid hydrocarbon, a gas or liquefied gas, or non-gaseous foaming agents.

11. The method of claim 10 wherein the non-gaseous foaming agent is selected from the group that consists of alkyl betaines, alkyl sultaines, alkyl carboxylates, alkyl ether sulfates, ethoxylated ether sulfates, phosphate esters, alkyl ether phosphates, ethoxylated alcohol phosphate esters, alkyl sulfates, alpha olefin sulfonates, alkyl quaternary ammonium salts, alkyl benzyl quaternary ammonium salts, and alkyl amido amine quaternary ammonium salts.

12. The method of claim 1 wherein the diverting particles comprise between about 0.01% and about 30% of the weight of the carrying fluid.

13. The method of claim 1 wherein viscous pills are formed from the diverter particles.

14. The method of claim 1 wherein gravel packing occurs with the diverting particles.

15. The method of claim 14 wherein the gravel packing occurs by slurrying diverting particles comprising Compounds I and II, and then introducing the slurried diverting particles into the wellbore adjacent to the subterranean formation by circulation.

16. The method of claim 1 wherein the diverter material particles, inserted after conventional proppants are inserted into the subterranean formations, forms a complex branched fracture network within subterranean formations.

17. The method of claim 1 wherein a breaker is added to the carrying fluid.

* * * * *